Dec. 22, 1936.    P. W. GEYER    2,065,308
SIGNALING SYSTEM
Filed Aug. 10, 1934    2 Sheets-Sheet 1

INVENTOR.
PAUL W. GEYER,
BY Duell & Kane.
ATTORNEYS.

Dec. 22, 1936.   P. W. GEYER   2,065,308
SIGNALING SYSTEM
Filed Aug. 10, 1934   2 Sheets-Sheet 2

INVENTOR.
PAUL W. GEYER,
BY Duell & Kane.
ATTORNEYS.

Patented Dec. 22, 1936

2,065,308

UNITED STATES PATENT OFFICE 2,065,308

SIGNALING SYSTEM

Paul W. Geyer, New York, N. Y.

Application August 10, 1934, Serial No. 739,287

3 Claims. (Cl. 177—329)

This invention relates to a functionally and structurally improved signaling system, as well as electrical apparatus which may form a part of such system or be otherwise advantageously employed.

It is a well appreciated fact that considerable difficulty has been experienced in connection with signal systems and especially systems employed in the power dispatcher's office of railroads and similar organizations. More especially it has been customary for one of the local employees of the organization to communicate with such office and request a de-energization of a certain section of the line. Thereupon, the power dispatcher's office has examined the plan of the line or system and after ascertaining what control circuits should be disconnected, has communicated with the proper sub-station, and ordered that one or more circuits be opened in order to de-energize the section in question. In order to indicate the condition of all sections of the line, it has been customary to apply to the plan or chart of the line or system a series of red thumb tacks or similar markers which indicated the energization of those particular sections which were connected to the source or sources of power. Upon ordering de-energization of a particular section, as afore outlined, the red marker would be removed from the corresponding portion of the plan or chart and would be replaced by a green thumb tack or other suitable marker to indicate the current condition of the section in question. The difficulties in following a procedure of this nature are obvious, and while it is entirely practicable to employ a so-called "supervisory" system to avoid these difficulties, the use of such a system calls for the expenditure of a large amount of money.

By means of the present invention, a control board or system is provided which will allow the power dispatcher to remain seated at his desk and at the same time to rapidly and accurately maintain signal indications such that he will be correctly informed (by glancing at the chart or plan of the system) as to the current conditions of the component sections of the system.

A further object of the invention is that of providing a signaling system capable of use in numerous different associations, but of particular value when employed as afore outlined and by means of which the liability of error will be reduced to a minimum.

Another object of the invention is that of furnishing a switch capable of being employed in many different types of electrical systems, but which is ideally adapted for use in connection with signaling systems and wherein it is to be manually operated.

Still another object is that of providing a system and switch having these characteristics and which will embody relatively few parts, each individually simple and rugged in construction, and capable of ready assemblage to provide a unitary apparatus operating over long periods of time with freedom from difficulties.

With these and other objects in mind, reference is had to the attached sheets of drawings illustrating one practical embodiment of the invention and in which.

As afore brought up the present invention is primarily intended for use in connection with power dispatcher's offices and systems. For this reason the illustrated embodiment has been confined to such a system. It will, however, be understood that the teachings of the present invention might be profitably employed in numerous other associations, and it is accordingly intended that these specifications and drawings be interpreted as illustrative rather than in a limiting sense. Thus, referring to Fig. 1 there has been indicated at 5, a section of a board or panel which may be placed upon the desk of or adjacent the station of the dispatcher. This panel has upon it a diagram 6, indicating the various power lines of the system and the location of the circuit breakers 7.

Figure 2:
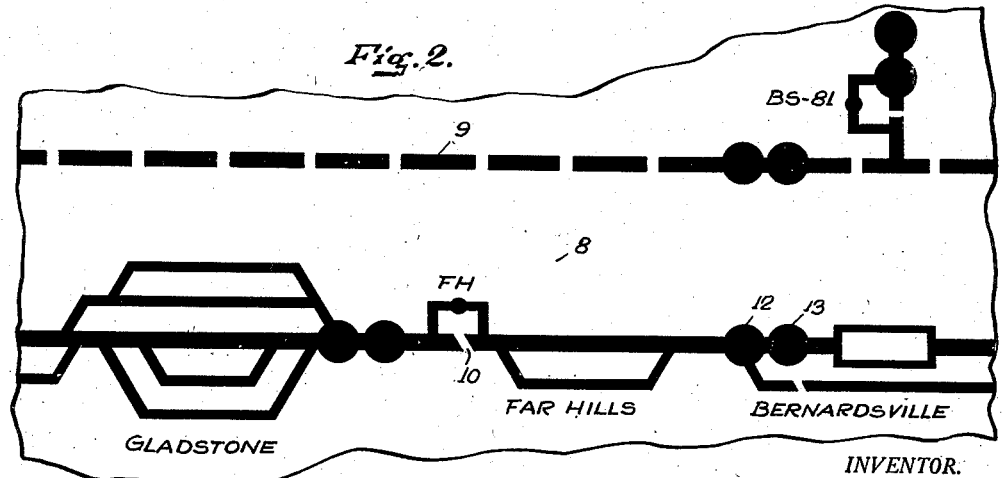
Fig. 2 is a similar view of the chart or plan which may for example be affixed to the wall of the dispatcher's office.

In Fig. 2, there has been indicated at 8, a section of the plan or chart which may conveniently be affixed to the wall of the dispatcher's office, and which contains a diagram 9, including representations 10, of the circuit breakers 7, as well as other suitable identifying indicia 11 which may enable the dispatcher to readily visualize all details of the system. It will be understood that the actual panels providing both the control board and the chart or plan will usually be relatively extended, and the diagrams thereon will either illustrate the entire system or major units thereof. For the purpose of simplification, the present drawings have been confined to representing merely small portions of both panels.

Figure 1:
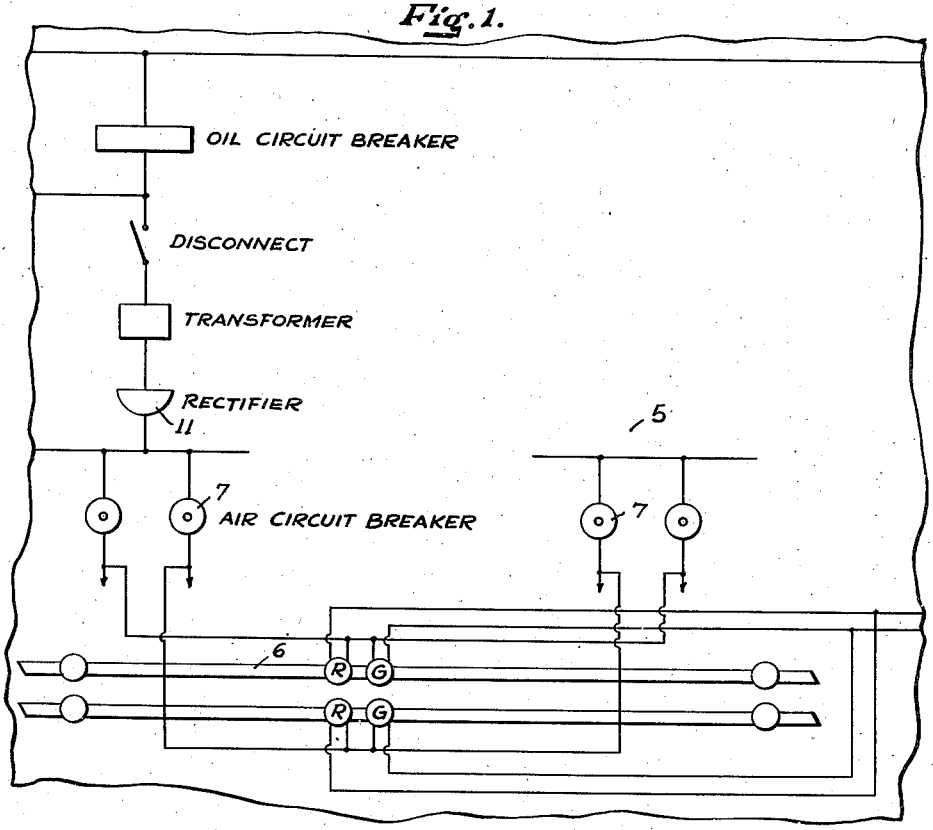
Fig. 1 is a face view of a portion of the panel forming a part of a control board.

As illustrated in Fig. 1, each of the circuit breakers indicated at 7, may have within the area of its illustration an actuating element which preferably takes the form of a switch hereinafter more particularly described. As illustrated in Fig. 1, there is embraced within the area of the circuit breakers representation an opening which may serve to guide an actuating element. Obviously if a switch different from the type hereinafter referred to is employed the openings might, in certain instances, be dispensed with and any substitute structure be provided in lieu thereof.

As shown in Fig. 2, each of the power sections capable of isolation from other sections of the system has associated with it a signal, preferably taking the form of a pair of bulbs 12 and 13, one of which may be colored red and the other of which may be colored green. Obviously in lieu of colored bulbs ordinary bulbs might be employed and at positions overlying the same on panel 8, might mount suitable colored lenses. In fact according to certain aspects of the invention electric bulbs might be entirely dispensed with and any other functionally equivalent signal elements might be substituted therefor.

Figure 3:
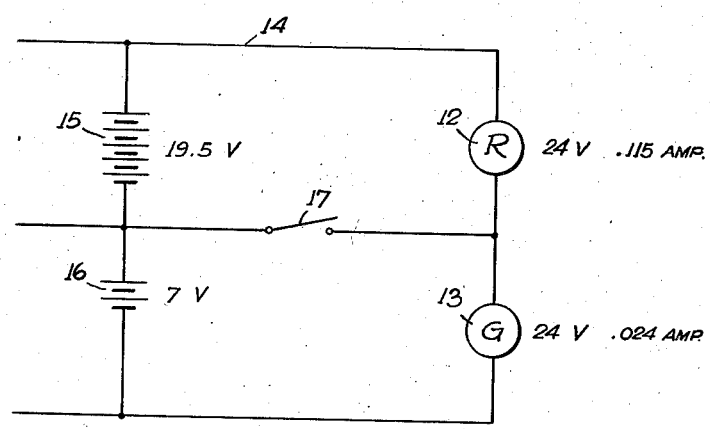
Fig. 3 is a diagrammatic illustration of a portion of the plan or chart as shown in Fig. 2, and illustrating the connections which are preferably employed.

However, it is preferred that bulbs be employed and if this is done the bulbs are preferably connected in the manner shown in Fig. 3. In this view the bulb 12 gives the red indication and the bulb 13 a green indication.

These bulbs are arranged in series parallel by leads 14, with sources of electrical current supply indicated at 15 and 16. A switch 17 is interposed in one of the leads and the resistances and voltages of the circuits are so balanced that when the switch is open the green light will be energized and the red light will practically give no visual indication. When the switch is closed, bulb 12 will be energized and bulb 13 will be practically extinguished. One example of such value is to be found in having the source 15, of 19.5 volts and the source 16, of 7 volts, giving a combined voltage of 26.5 volts. In such an arrangement bulbs 12 and 13 will be of the 24 volt type, but the first will draw, for example, 0.115 amp., while the second will draw 0.024 amp.

With such values the foregoing results will be achieved, and it will obviously be appreciated that with the switch 17 closed (its normal condition) that the panel 8 will normally display red (i. e. danger) signal indications in the various sections of the diagram 9, thus indicating that these sections are energized. At this time it will be appreciated that signal indications or their equivalent might be produced by a layout as indicated in Fig. 3, and not in any manner limited to a system of the particular nature heretofore described.

Figure 4:
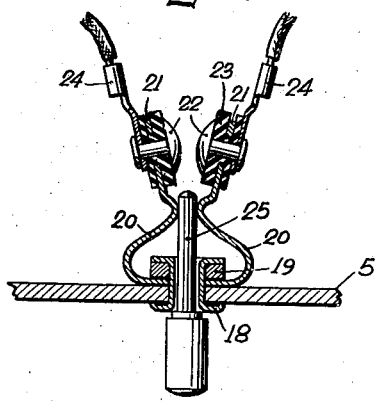
Fig. 4 is a partly sectional edge view of the switch unit.

As shown in Fig. 4, the switch and its mounting may include a rivet or flanged collar member 18, attached to the panel 5, and extending through one of the openings 7 thereof. This member may be firmly secured against movement by having its inner edge portion extended over the face of a washer 19. Interposed between this washer and the inner face of the panel 5, is the base of a spring member 20 having an opening of adequate size to permit of the accommodation of the collar or rivet member 18. The spring member 20 may simply be formed from a strip or member having inherent resilience and including two outwardly extending arm portions 21, which normally tend to lay adjacent to each other. Secured to each of these arms are contact elements 22, which are insulated therefrom as for example at 23 and carry terminals 24 for attachment to the leads 14. The contact buttons or element 22, normally engage each other so that the circuit is closed, but by introducing an actuating stem 25 through the hole in the rivet 18 (i. e. through the opening 7 of the panel 5) the converging portions of the strip 20 are forced apart so as to separate contacts 22, thus opening the circuit and causing a green or safety signal indication.

From the foregoing it will be appreciated that the present invention teaches a manner in which a power dispatcher's board or system may be accurately and economically controlled in such manner that errors and accidents will be reduced to a minimum. Moreover, a signaling or control circuit is taught which is ideally adapted and particularly intended to be used in connection with a control system, although it is not necessarily restricted to such use. Additionally, a simple and compact switch structure is provided which again is ideally suited for use in the particular association named, but which may be advantageously employed in numerous additional associations.

Thus among others the several objects of the invention as specifically afore noted are achieved. It will be appreciated that numerous changes and re-arrangements of the parts might be resorted to without departing from the spirit of the invention as defined by the claims.

I claim:

1. In a signaling system, a plurality of sources of electrical current supply arranged in series, a plurality of spaced signaling means arranged in series with each other and said sources of supply, a switch connected at one of its ends at a point between said spaced signaling means and at its other end at a point between said sources of current supply, the voltage of said different sources and the current consumption of said signaling means being so balanced that, with said switch in open condition, current will flow from both said sources and through said signaling means to operate one of the same, the other signaling means remaining substantially inoperative, said switch, when causing current to flow from each said source to each of said signaling means, whereby the previously operated signaling means will become substantially inoperative and the said other signaling means will be rendered operative.

2. In a signaling system, a plurality of sources of electrical current supply, a pair of electric bulbs, said bulbs and sources being arranged in series parallel, and a switch having one of its ends connected between said sources, its opposite end being connected between said bulbs, the current consuming property of said bulbs being so balanced with reference to the voltage of said sources that with the switch in open condition and current flowing through both of said sources and through both of said bulbs, one of said bulbs will be energized while the second of the same will be substantially inoperative, while with the switch in closed position and current flowing from the individual sources to the individual bulbs, the second bulb will be energized and the first named bulb will become substantially inoperative.

3. In a signaling system a pair of sources of electrical current supply connected in series, a pair of electric bulbs also connected in series, leads for connecting said supply sources with said bulbs, a further lead having its ends connected to and interposed between said pairs of sources and bulbs, and a switch in said latter lead, the electrical value of said sources when connected in series being sufficiently great to operatively energize one of said bulbs and when the sources are connected individually to the bulbs only one of said sources having an electrical value sufficient to operatively energize the other of said bulbs whereby when the switch is in closed condition one of said bulbs will be energized and the second of the same will be substantially inoperative, while with the switch in open condition the latter bulb will be energized while the first of the same will be substantially inoperative.

PAUL W. GEYER.